United States Patent

Whipker

[15] 3,659,126

[45] Apr. 25, 1972

[54] MAGNETIC TORQUE CONTROL COUPLING

[72] Inventor: Jesse A. Whipker, P.O. Box 361, Columbus, Ind. 47201

[22] Filed: Apr. 5, 1971

[21] Appl. No.: 131,362

[52] U.S. Cl..................................................310/92, 310/84
[51] Int. Cl......................................................H02k 49/00
[58] Field of Search..................310/78, 79, 102, 80, 84, 113, 310/94, 92, 152, 95, 96, 156, 100, 101, 171, 114, 192, 156; 335/74

[56] References Cited

UNITED STATES PATENTS 2,871,383   1/1959   King..........................................310/96
3,171,995   3/1965   Ponsy........................................310/100
3,573,518   4/1971   Liles..........................................310/156
3,558,945   1/1971   Hulle.........................................310/101

Primary Examiner—William M. Shoop, Jr.
Assistant Examiner—R. Skudy
Attorney—Woodard, Weikart, Emhardt & Naughton

[57] ABSTRACT

Disclosed is a coupling in which the drive shaft initially picks up the load provided by a driven shaft through a resilient element and subsequently drives the load through a magnetic link between the drive and driven shaft, the magnetic link and hence the degree of torque transfer being controlled by the level of magnetic flux through the link.

6 Claims, 4 Drawing Figures

PATENTED APR 25 1972

3,659,126

INVENTOR
JESSE A. WHIPKER
BY
Woodard, Weikart, Emhardt & Naughton
ATTORNEYS

MAGNETIC TORQUE CONTROL COUPLING

BACKGROUND OF THE INVENTION

Operation of machinery, such as hammermills for example, demand a high starting torque, because of the high inertia load, and a relatively long acceleration period. Because power requirement is relatively high at the initial pick-up of the load, and only reduced power is needed thereafter, heretofore such applications have conventionally required relatively expensive reduced voltage electric starters. Further, in applications where constant speed electric motors are utilized, a relatively simple overload responsive means, such as a fuse, is satisfactory, however, where a variable speed motor provides the drive, at low speed the motor is capable of producing torque sufficient to shear or otherwise damage the driven equipment should an abnormal obstruction or jamming of the apparatus occur. Material transfer augers utilized on farm machinery are examples of equipment of the type referred to. In such equipment attempts have in the past been made to solve the problem by using shear pins in the power train for the auger. This solution leaves much to be desired for the shear pins are often difficult and time consuming to replace and are often replaced by steel non-shear pins or by pins which shear only under loads too large.

The concept of the present invention utilizes a spring loaded, magnetic link between the drive member and the driven member with the torque transfer between the members being dependent on the level of energization of electromagnet producing the flux linkage across the magnetic elements. The apparatus is relatively simple, acts as a safety device for overloads and can be used as a speed control when used in conjunction with a tachometer generator and relay meter.

DESCRIPTION OF THE PREFERRED EMBODIMENT

Figure 1:
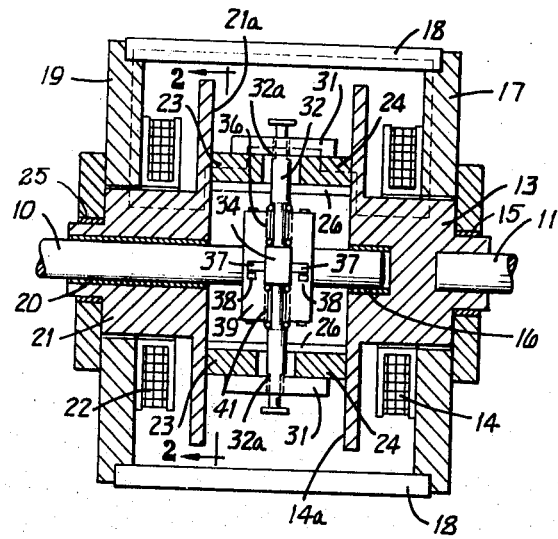
FIG. 1 is a side sectional view of an apparatus embodying the present invention.

Referring initially to FIG. 1, the coupling assembly includes a drive member which takes the form of a drive shaft 10 and a driven member in the form of the driven shaft 11, the shafts being coaxial. Rigidly attached to the driven shaft 11 is a magnetically permeable member 13 around which is wrapped a direct current coil 14 and provided with a portion presenting a flat, circular face 14a. A bearing 16 in the member 13 journals for free rotation the extending end of the shaft 10. A further bearing 15 permits the shaft 11 and attached member 13 to rotate freely with respect to the stationary, magnetically permeable disc 17. The stationary disc is rigidly attached to a magnetically permeable series of bars 18 which extend parallel to the shafts 10 and 11 are rigidly attached to a stationary, magnetically permeable disc 19 which is similar in configuration to the disc 17. A magnetically permeable member 21, which is provided with a portion providing a flat circular face 21a spaced from an opposing the surface 14a, is journaled in a bearing 25 carried by disc 19.

A direct current coil 22 is wrapped about the member 21, however it is supported on, or secured to, the stationary disc 19. A bearing 20 journals the member 21 upon the drive shaft 10, enabling the shaft 10 to rotate freely with respect to the member 21. The windings 14 and 22 are supported on the stationary portion of the structure and no slip rings or brushes are necessary to energize them. Extending outwardly from the faces 21a and 14a are pole pieces 23 and 24. The windings 14 and 22 are oriented so that the pole pieces 23 and 24 are of opposite polarity when a D.C. voltage is impressed on the coils. Adjacent the pole pieces 23 and 24 and extending between the face portions 21a and 14a are non-magnetically permeable bars 26 which serve to brace the assembly.

Figure 2:
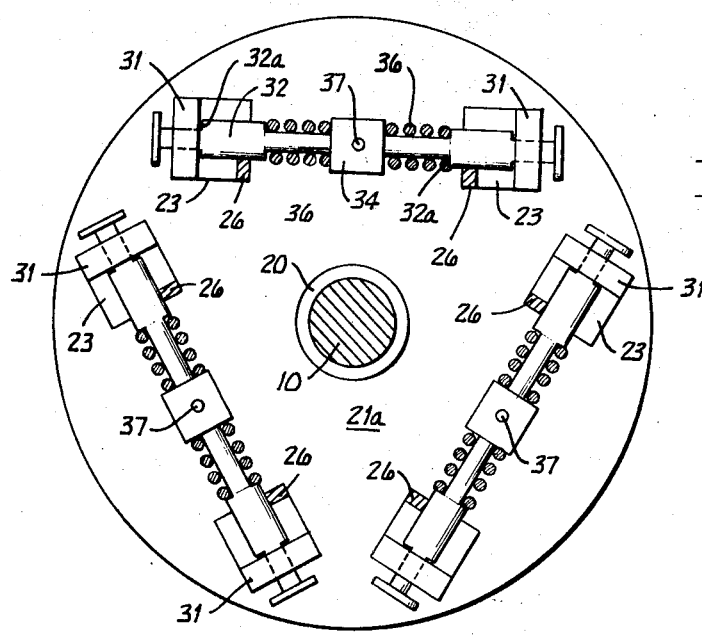
FIG. 2 is a view taken generally along the line 2—2 of FIG. 1.

Referring primarily to FIGS. 1 and 2, it will be evident that each of the adjacent pole pieces 23 and 24 are spanned by a magnetically permeable armature bar 31. Freely supported within apertures in each of the several pairs of armatures 31 are elements in the form of rods 32 which, by means of the shoulders 32a on the rods, have a lost-motion connection with the armatures, that is, a limited amount of axial motion of the rod 32 occurs before the shoulders 32a break the armatures 31 away from their respective pole pieces.

The central portion of the rod 32 is reduced somewhat in diameter and freely accommodated on this intermediate portion is a pick-up member 34. Compression springs 36 extend between the rod and the member 34 and serve to bias the member 34 to a central position on the shaft. The member 34 has abutments 37 extending from its opposite sides as may particularly be seen in FIG. 1.

Figure 4:
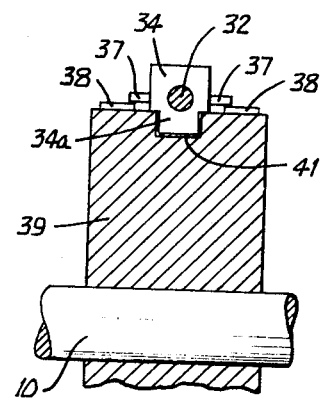
FIG. 4 is a fragmentary, sectional view of a portion of the apparatus shown in FIG. 1.
Figure 3:
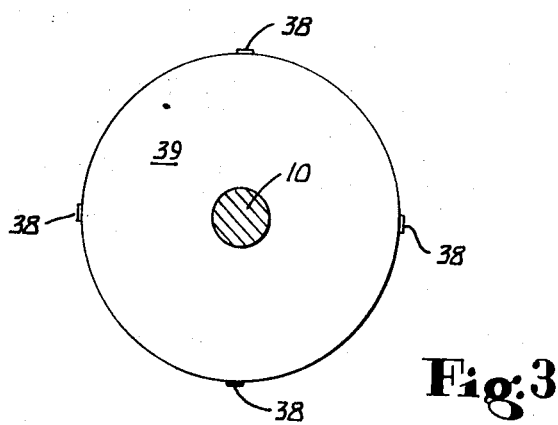
FIG. 3 is an end view of a portion of the apparatus shown in FIG. 1.

As may be seen in FIG. 1, the abutments 37 are adapted to be engaged by abutments 38 extending from the circumference of a disc shaped member 39 (FIG. 3). As will be particularly evident from FIG. 3, the abutments 38 are spaced about the periphery of the member 39 and the member 39 itself is rigidly attached to the drive shaft 10 and rotates with the shaft. As may best be seen in FIG. 4 the peripheral area of the member 39 is provided with an annular groove 41 which freely accommodates the depending portion 34a of the pick-up member 34, the extension of the portion 34a into the groove 41 serving to stabilize the member 34 and the rod 32. As will be apparent from a comparison of FIGS. 1 and 2, the rods 32 extend generally tangential to the central, disc shaped member 39 and while three rod and armature assemblies are disclosed, it will be understood that more might be utilized, with correspondingly additional armatures and pole pieces provided on a disc shape member of larger diameter.

In operation, with the drive shaft rotating in the direction indicated by the arrow in FIG. 1, the member 39 will be rotated, engaging the abutments 38 with the adjacent abutments 37 on the collar or pick-up member 34. This initial engaging motion of the member 39 moves the member 34 along the rod 32 compressing the spring 36, the motion of the member 34 on the rod being upwardly as viewed in FIG. 1. As the spring 36 is compressed, during this motion the rod 32 will be moved through the springs 36 until the shoulder 32a on the rod engages the armature 31. Thereupon, the armature 31 will be moved and movement of the armature will pull along the pole pieces 23 and 24, rotating the members 19 and 17 and consequently rotating the driven shaft 11 in the same direction as the rotation of the drive shaft 10. This motion impulse through the armature 31 will have a duration dependent upon the mount of magnetic flux linking the armature with the members 19 and 17, the path of the magnetic flux being indicated by a broken line in the upper portion of FIG. 1. As the abutments 38 pass beneath and away from the abutments 37 upon continued rotation of the member 39 the springs 36 will again center the collar 34 on the rod 32 and the abutments 37 carried by the collar will again be in position for engagement with the next set of abutments 38 on the members 39 as rotation continues. It may thus be seen that motion impulses are transferred to the driven shaft 11 and these impulses have a magnitude which is dependent upon the D.C. voltage applied to the coils 22 and 14.

It will be evident from a comparison of FIGS. 1 and 2 that for rotation in one direction only one end of the rods and one set of armatures and pole pieces are used for each rod assembly, and when rotation is opposite in direction to that shown in FIG. 1 the armatures and opposite ends of the rods 32 will be utilized to provide motion impulses to the driven shaft 11. The apparatus can thus be driven in either direction and the driven shaft output will correspond in direction to that of the drive shaft. It will be understood that in applications where rotation is to be transmitted to the driven shaft in only one direction, transposing the position of the armature and rod shoulders which engage the armature at one end of the rod assemblies will permit both ends of the rod assemblies to be utilized to transmit motion and the capacity of the apparatus could be increased.

What is claimed is:

1. An electromagnetic power transfer coupling comprising a drive member and a driven member, a series of spaced abutments carried by the drive member, electromagnetic means carried by said driven member including an armature linking the magnetic flux generated by energization of said electromagnetic means, an element having a lost-motion connection with said armature, a motion pick-up member having abutments thereon adapted to be engaged by said drive member carried abutments, said pick-up member being supported on said armature-connected element, resilient means extending between said pick-up member and said element biasing said pick-up member abutments toward engagement with said drive member carried abutments, whereby upon motion of said drive member said abutments will engage thereby transmitting motion through said resilient means to said pick-up member and to said armature, and through said armature to said electromagnetic means and said driven member, with the kinetic energy transferred through said coupling being determined by the level of energization of said electromagnetic means.

2. A coupling as claimed in claim 1 in which said drive member takes the form of a rotating shaft and said driven member is a shaft adapted for rotation coaxially with said drive shaft, and said electromagnetic means includes two spaced pole-pieces supported on said driven shaft with said armature spanning said pole pieces and said drive shaft carried abutments, armature-connected element and pick-up member being disposed between said spaced pole-pieces.

3. A coupling as claimed in claim 2 in which said electromagnetic means further includes coils associated with each of said pole pieces to produce opposite polarity therein, with the level of kinetic energy transferred by said coupling thus being determined by the D.C. voltage applied to said coils.

4. A coupling as claimed in claim 2 in which said drive shaft carried abutments extend from the circumference of a disc-shaped member carried by and rotated with the drive shaft, said armature-connected element takes the form of a rod extending generally tangential to said disc-shaped member and said pick-up member is a collar freely slidable along said rod, and said resilient means takes the form of a coiled compression spring encircling said rod and extends between a shoulder on said rod and said collar to thereby urge said collar into a position along said shaft permitting said abutment carried by the collar to be engaged by said drive shaft carried abutments.

5. A coupling as claimed in claim 4 in which said disc-shaped member is provided with a circumferential groove and said collar is provided with a depending portion which is accommodated within said groove to stabilize said collar upon said rod.

6. A coupling as claimed in claim 4 in which a further pair of electromagnetic spaced pole pieces are spanned by a further armature also having a lost motion connection with said rod at the end of the rod remote from its connection to said first mentioned armature whereby torque is transferred to said driven shaft by said drive shaft in either direction of axial rotation of said drive shaft.

* * * * *